(12) United States Patent
Roline et al.

(10) Patent No.: US 7,364,204 B2
(45) Date of Patent: Apr. 29, 2008

(54) INTEGRATED TRANSFER LINE FOR AUTOMOTIVE STEERING SYSTEM

(75) Inventors: Eric A. Roline, Morristown, TN (US); William E. Allen, Jr., Kingsport, TN (US); John Leidy, Rogersville, TN (US); Dennis F. Harer, Kingsport, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 341 days.

(21) Appl. No.: 11/086,836

(22) Filed: Mar. 22, 2005

(65) Prior Publication Data

US 2006/0213716 A1  Sep. 28, 2006

(51) Int. Cl.
*B62D 5/06* (2006.01)
(52) U.S. Cl. .............. 285/179; 285/288.1; 285/289.1; 180/417
(58) Field of Classification Search ................ 285/179, 285/288.1–289.5; 180/417
See application file for complete search history.

(56) References Cited

U.S. PATENT DOCUMENTS

| 1,947,581 | A | * | 2/1934 | Cornelius ................ 285/289.1 |
| 5,285,864 | A | * | 2/1994 | Martin et al. .............. 180/417 |
| 5,593,279 | A | | 1/1997 | Hayashi |
| 5,728,981 | A | | 3/1998 | van Ruiten |
| 5,904,221 | A | * | 5/1999 | Breitweg et al. ........... 180/417 |
| 5,975,590 | A | * | 11/1999 | Cowan et al. ......... 285/133.11 |
| 6,176,342 | B1 | * | 1/2001 | Luibrand et al. ........... 180/427 |
| 6,382,343 | B1 | | 5/2002 | Engler |
| 6,655,491 | B1 | | 12/2003 | Stoll et al. |
| 6,681,883 | B2 | * | 1/2004 | Loh et al. .................... 180/417 |
| 2004/0250676 | A1 | | 12/2004 | Urbach |
| 2005/0166993 | A1 | | 8/2005 | Viken et al. |

FOREIGN PATENT DOCUMENTS

| DE | 29510508 | 12/1995 |
| FR | 2790239 | 1/2000 |

* cited by examiner

*Primary Examiner*—Kevin Hurley
(74) *Attorney, Agent, or Firm*—MacMillan, Sobanski & Todd, LLC

(57) ABSTRACT

An apparatus according to this invention for carrying hydraulic fluid in a power assisted automotive steering system, includes a tube having a tube wall formed with a first port that extends though a thickness of the tube wall. A housing includes a wall formed with a second port extending though a thickness of the housing wall. A retainer is secured to the housing. A fluid transfer line includes a first surface that contacts an outer surface of the tube, is formed with a passage communicating with the first port, is sealed against fluid flow past the first surface, and is secured to an outer surface of the tube. A second surface contacting the retainer is formed with a passage communicating with the second port, is sealed against fluid flow past the second surface, and is secured to the housing by the retainer.

3 Claims, 8 Drawing Sheets

INTEGRATED TRANSFER LINE FOR AUTOMOTIVE STEERING SYSTEM

BACKGROUND OF THE INVENTION

1. Field of the Invention

The present invention relates generally to automotive steering system. More particularly, it pertains to apparatus for hydraulically sealing and connecting transfer lines to a tube and housing.

2. Description of the Prior Art

A power-assisted, rack and pinion steering system for automotive applications includes a steering shaft controlled manually by the vehicle operator by rotating the vehicle's steering wheel. The steering shaft is connected through a flexible coupling to a pinion gear, which is driveably engaged with a rack located in a relatively thick walled tube. The rack extends laterally from a housing to a mechanism that steers the vehicle's wheels.

The tube also contains a hydraulic double-acting piston, which is secured to the rack. A piston moves in a cylinder located in the tube in response to differential pressure across the piston. A control valve alternately pressurizes and vents the opposite faces of the cylinder in response to rotation of the steering wheel and pinion gear. As the rack moves in opposite linear directions along the tube in response to rotation of the steering wheel, a net hydraulic pressure force produced on the piston assists the vehicle operator to steer the wheels by adding to the force on the rack applied manually by the vehicle operator. In this way, the operator's effort and the degree to which the steering wheel is rotated in order to produce a desired change in direction are reduced.

Transfer lines carry pressurized hydraulic fluid from the housing to the cylinder located in the tube. Generally the housing is formed of cast aluminum, but the tube and transfer lines are of steel. The physical property differences and strength dissimilarities of the metals add to the complicity of the connections at each end of the transfer lines.

There is a long felt need in steering gear design for an efficient, low cost technique to connect the transfer lines to the outer surface of the tube without use of weld stud adapters attached to the rack tube and providing a screw-in attachment to the transfer lines. It is desired that the transfer lines be connected to the aluminum housing using a screw-in attachment, or a metallic bond to a threaded insert, or a slip attachment that is hydraulically sealed.

SUMMARY OF THE INVENTION

The present invention concerns an apparatus for connecting pressure transfer lines to the outer surface of the main rack tube either through a direct connection in which the lines are connected to the tube's outer surface by brazing, soldering or welding, or indirectly using a fitting, which is attached directly to the outer surface of the main rack tube by brazing, soldering or welding and provides a sealed slip attachment with the transfer line.

The opposite end of the transfer lines are connected to the housing either using a threaded insert engaged with screw threads formed in the housing wall, an insert molded in place, or a retainer plate attached to the housing. In either case, the transfer lines are connected to the insert or retaining plate by a brazed, soldered or welded connection, each attachment providing an integral hydraulic seal.

These connections provide simplicity of assembly, allow the transfer lines to be installed during the assembly of the tube to the housing, and easily accommodate diverse applications because of the improved clearance space provided.

An apparatus according to this invention for carrying hydraulic fluid in a power assisted automotive steering system, includes a tube having a tube wall formed with a first port that extends though a thickness of the tube wall. A housing includes a wall formed with a second port extending though a thickness of the housing wall. A retainer is secured to the housing. A fluid transfer line includes a first surface that contacts an outer surface of the tube, is formed with a passage communicating with the first port, is sealed against fluid flow past the first surface, and is secured to an outer surface of the tube. A second surface contacting the retainer is formed with a passage communicating with the second port, is sealed against fluid flow past the second surface, and is secured to the housing by the retainer.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1A:
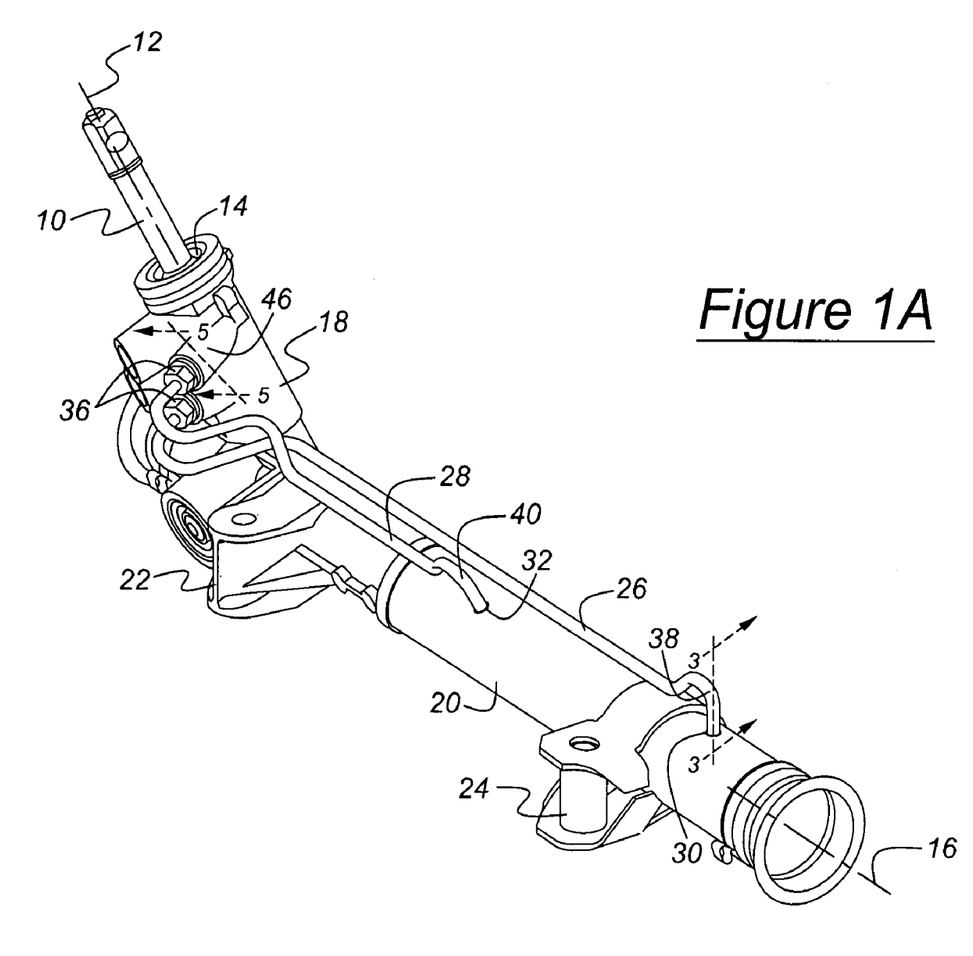
FIGS. 1A-1C are isometric views of a steering gear assembly for an automotive vehicle showing transfer lines secured to a tube and various connections to a housing at the opposite end of the transfer lines.

FIG. 1A is an external isometric view of a power-assisted rack and pinion steering mechanism for an automotive vehicle. The vehicle operator rotates the steering shaft 10 about axis 12 by turning the vehicle's steering wheel. The steering shaft 10 is driveably connected through a flexible coupling 14 to a pinion gear, located in a housing 18, which also contains a fluid control valve. The pinion gear is driveably engaged with a rack located in a relatively thick walled tube 20, which extends transversely from housing 18 and also contains a hydraulic double acting piston secured to the rack. The rack moves in opposite linear directions along axis 16 in response to rotation of the steering wheel and pinion gear in opposite angular directions. The tube 20 and housing 18 are supported on the frame of the vehicle by mounting brackets 22, 24.

The piston, located in tube 20 and secured to the rack, is actuated by pressurized hydraulic fluid supplied to a cylinder located on opposite sides of the piston. A transfer line 26 carries pressurized fluid to one side of the piston; transfer line 28 carries pressurized hydraulic fluid to the other side of the piston. As soon in FIG. 1A, transfer line 26 is directly connected at 30 to the outer surface of tube 20, and transfer line 28 is directly connected at 32 to the outer surface of the tube 20. The opposite ends of transfer lines 26, 28 are each connected to the wall 46 of valve-pinion housing 18 by an insert 36, which is threaded or molded in place into the housing wall. The axial outer end of transfer line 26 is formed with a bend 38 such that the end of the line is substantially perpendicular to the outer surface of tube 20. Similarly, the axial outer end of transfer line 28 is formed with a bend 40 so that the transfer line is substantially perpendicular to the outer surface of tube 20.

Figure 1B:
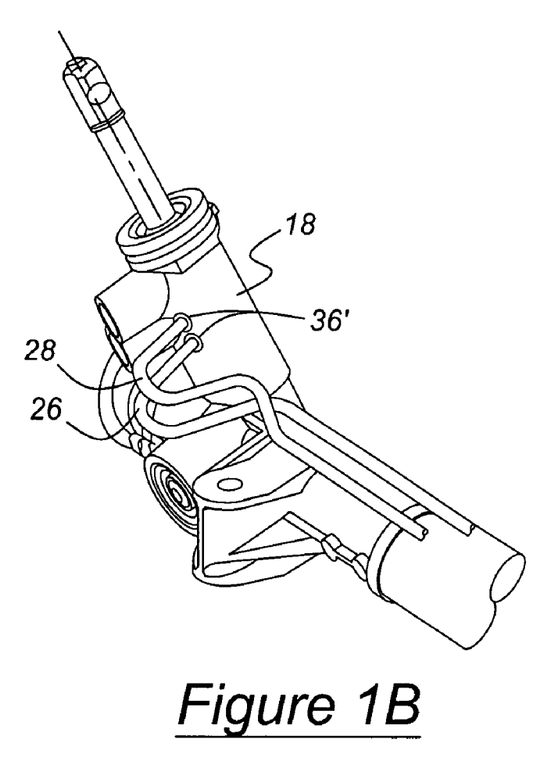
Figure 1C:
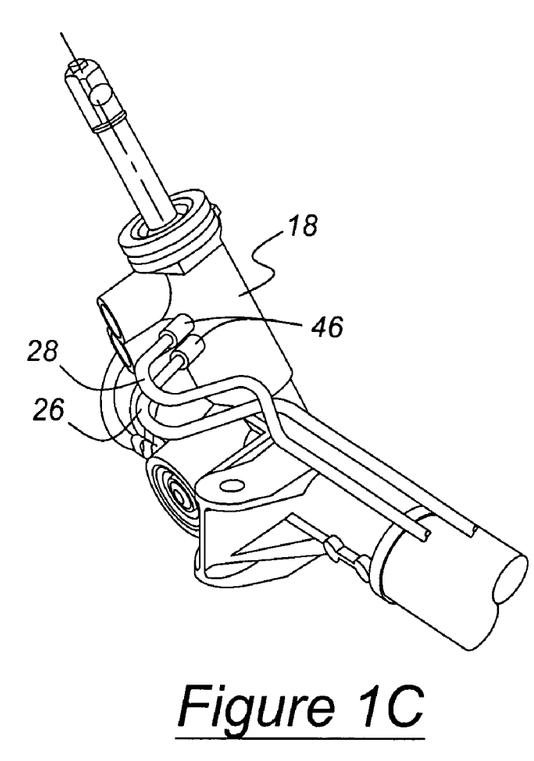

FIG. 1B shows an end of each transfer line 26, 28 connected to housing 18 using inserts 36' that are cast integrally with the housing wall 46. FIG. 1C shows an end of each a transfer line 26, 28 fitted in a respective boss on the wall 46 on the housing 18, the bosses being drilled to receive the ends of the transfer lines without inserts.

Figure 2:
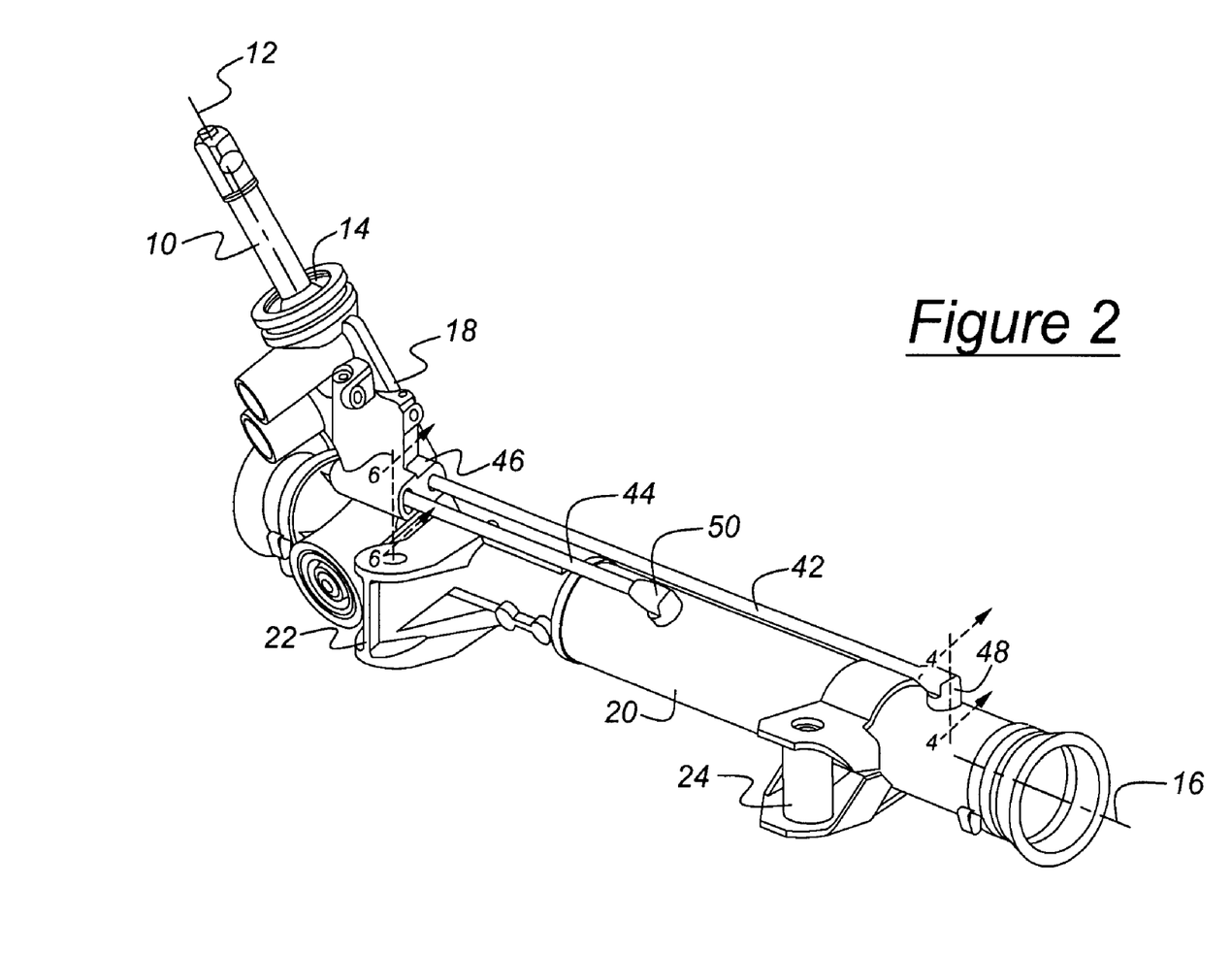
FIG. 2 is an isometric view of a steering gear assembly for an automotive vehicle showing transfer lines secured to a tube in accordance with the present invention.

Turning now to FIG. 2, transfer lines 42, 44, which extend transversely from the valve-pinion gear housing 18, are secured to the outer surface of tube 20 using weld fittings 48, 50, respectively. The opposite axial end of transfer lines 42, 44 is secured by a hydraulically sealed connection to the wall 46 of housing 18.

Figure 3A:
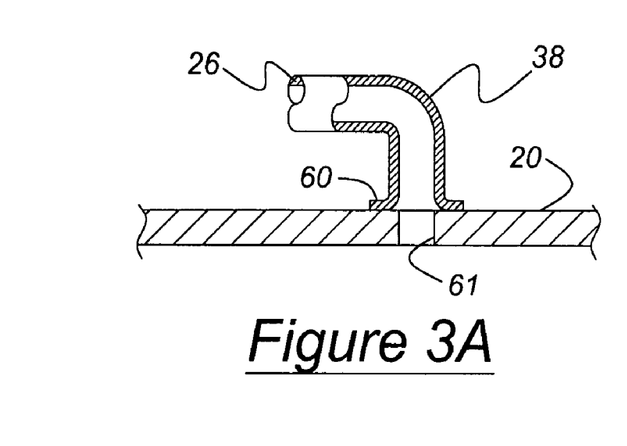
FIGS. 3A and 3B are cross sections taken at plane 3 of FIG. 1.
Figure 3B:
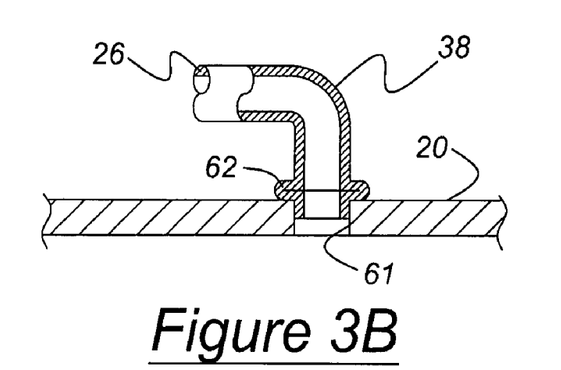

Referring now to FIGS. 3A and 3B, the bend 38 at the end of transfer line 26 positions the line substantially perpendicular to the outer surface of tube 20 such that the transfer line communicates sufficiently with a port 61 that passes through the wall thickness of the tube to allow fluid flow between the tube and the transfer line. The axial end of the transfer line 26 is formed with a flared flange 60, which is seated on the outer surface of tube 20 and secured to that surface by soldering, brazing or welding. This connection also seals against the flow of hydraulic fluid between the tube 20 and line 26.

FIG. 3B shows a transfer line 26 formed with a flange, preferably formed by axially compressing the tube to produce an overlapping flared flange 62, which is seated on the outer surface of tube 20 and secured to tube 20 by soldering, brazing or welding. Transfer line 26 communicates sufficiently with port 61 to allow fluid flow between the tube 20 and the transfer line.

Figure 4A:
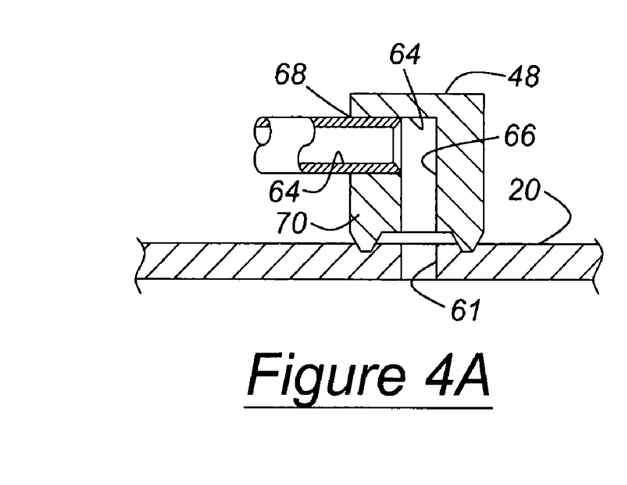
FIGS. 4A-4E are cross sections taken at plane 4 of FIG. 2.

FIG. 4A illustrates a 90-degree weld fitting 48 secured to the outer surface of tube 20 by soldering, brazing or welding. Fitting 48 includes a radial passage 66, which communicates with port 61 and with a lateral passage 64. Transfer line 42 is inserted in the lateral passage 64, to which it is secured at 68 by soldering, brazing or welding. A liquid sealer may be applied around the periphery of the transfer line 42 where is contacts at 68 the outer surface 70 of fitting 48 to seal against fluid flow and to enhance the seal provided by a connection between transfer line 42 and fitting 48 made by soldering, brazing or welding. Transfer line 42 engages the inner surface of lateral passage 64 preferably with an interference fit.

Figure 4B:
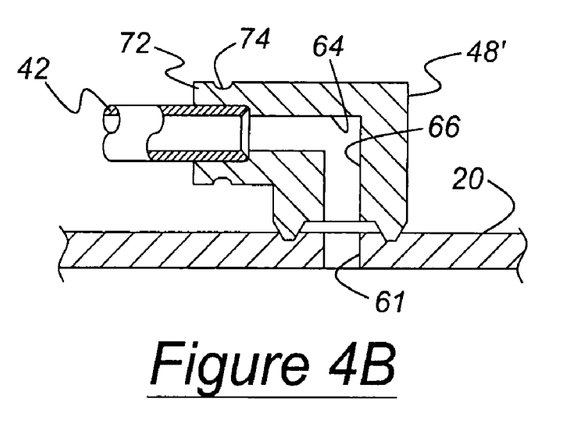

FIG. 4B illustrates a weld fitting 48' that is secured to the outer surface of tube 20 by welding, brazing or soldering. A lateral arm 72 of fitting 48' is formed during a swedging operation with an angular recess 74. Transfer line 42 is inserted in the lateral passage 64 and may be sealed and secured to fitting 48' by swedging the fitting in the vicinity of recess 74 so that it engages the transfer line with an interference fit. The swedged connection is an alternative or a supplement to securing the transfer line 42 to fitting 48' by soldering, brazing or welding.

Figure 4C:
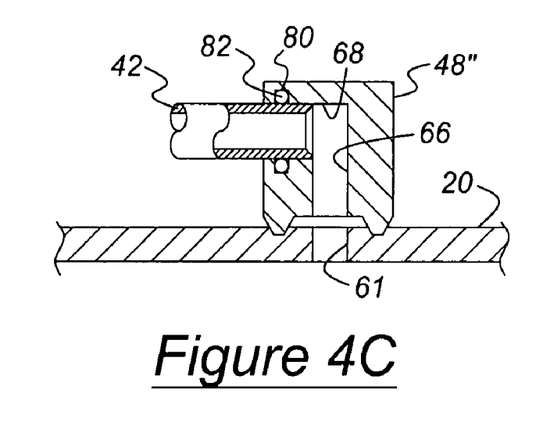

The weld fitting 48" shown in FIG. 4C is secured into the outer surface of tube 20 by soldering, brazing or welding. Fitting 48" includes a lateral passage 68, formed with a recess 80 containing an O-ring 82 or a comparable sealing device. Transfer line 42 is inserted into the lateral passage 68 and engages the O-ring 82 and the wall of the lateral passage with an interference fit, thereby sealing the passage against the flow of hydraulic fluid and securing the transfer line to fitting 48".

Figure 4D:
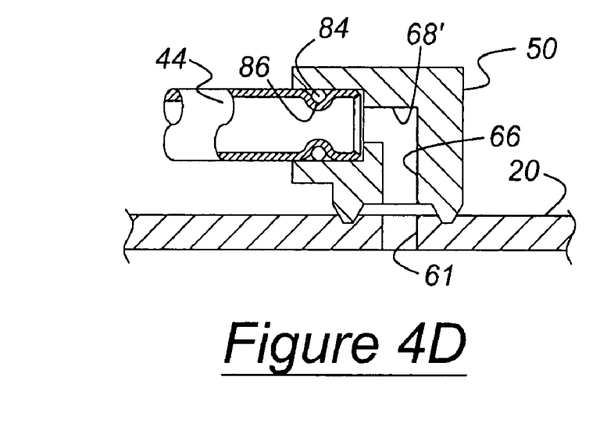

The weld fitting 50 shown in FIG. 4D is secured to the outer surface of tube 20 by soldering, brazing or welding. The fitting 50 is formed with an enlarged lateral passage 68', whose diameter is sized to receive transfer line 44 and the O-ring 84, located in the recess 86 formed on the outer surface of the transfer line 44. In this arrangement, an interference fit is produced between the surface of passage 68' and the outer radial surface of O-ring 84.

Figure 4E:
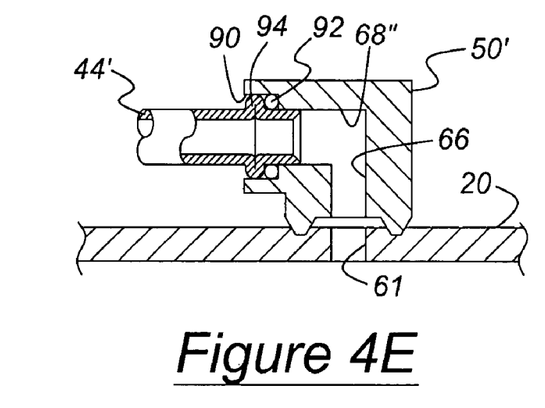

FIG. 4E shows yet another configuration of a transfer line 44 and a weld fitting 50', which is secured to the outer surface of tube 20 by soldering, brazing or welding. A portion of the length of the lateral passage 68''' is formed with larger diameter surface 90, which is sized to receive a sealing device such as an O-ring 92. A portion of the length of transfer line 44' is crimped to form an overlapping flange 94 that extends radially outward from the surface of transfer line 44' and is spaced axially from the nearest end of the transfer line. A terminal length of the transfer line 44', inserted in passage 68''', holds O-ring 92 in position between flange 94 and the step between surface 90 and lateral passage 68''. The radial outer surface of flange 94 frictionally engages surface 90 with a sufficient interference fit to maintain preloaded compression in the sealing device (92), thereby sealing the connection against the passage of hydraulic fluid and securing the transfer line 44' to the weld fitting 50'. The flange also prevents extrusion of the seal 84.

Figure 5A:
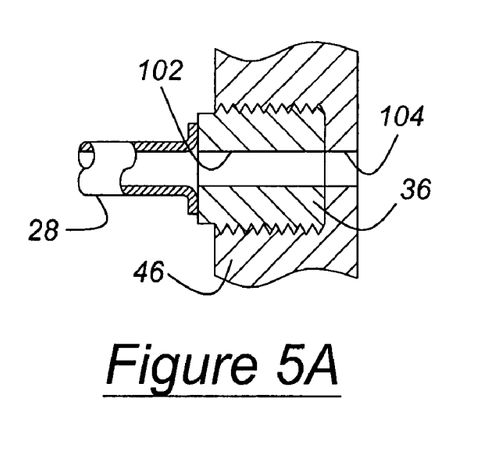
FIGS. 5A-5C are cross sections taken at plane 5 of FIG. 1.
Figure 5B:
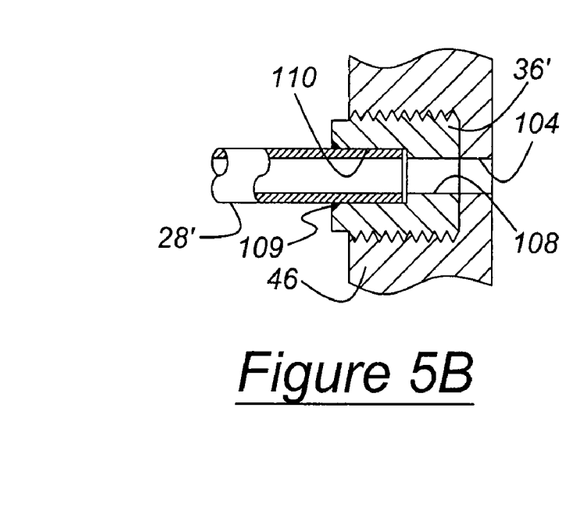
Figure 5C:
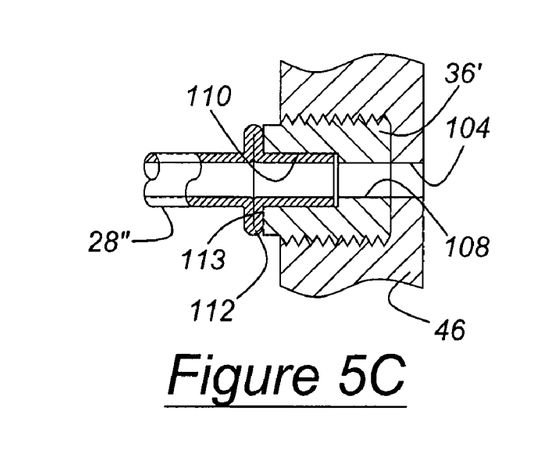

Referring now to FIGS. 5A-5C, wall 46 of housing 18 is relatively thick in relation to the wall thickness of the transfer lines 26, 28, 42,46 and of the tube 20, and it is formed preferably of aluminum, other cast metal including, but not limited to, zinc, iron, magnesium, whereas the transfer lines and tube are of steel.

As FIG. 5A shows, a retainer insert 36 has external screw threads that engage screw threads tapped into the wall 46 of housing 18, and a central passage 102 communicating with passage 104 formed in housing wall 46 to permit fluid flow between transfer line 28 and housing 18. A length of transfer line 28 near its end is flared radially outward forming a flange surface that is secured to insert 36 by welding, soldering or brazing. As FIG. 1A shows, the head of inserts 36 are each formed with a hexagonal surface to facilitate threading them into wall 46. The outer surface of the insert can either extend be located outward from the surface of the wall, or flush with the wall surface, or below the wall surface. Alternatively, as FIG. 1B shows, an insert 36' can be molded in place without having to be machined and screwed into the housing wall 46.

FIG. 5B shows another connection for securing transfer line 28' to housing wall 46 using a threaded retainer insert 36' formed with external screw threads. The threaded insert 36' is formed with a stepped central passage 108, communicating with the passage 104 in housing wall 46, to permit fluid flow between transfer line 28 and housing 18. The outer end of the insert has an enlarged surface 110, sized to receive transfer line 28', which is inserted into the insert and is secured to the insert by welding, soldering or brazing at a fillet 109. As shown in FIG. 1B, each insert 36' can be molded in place without having to be machined and screwed into the housing wall 46. The outer surface of the insert can either extend be located outward from the surface of the wall, or flush with the wall surface, or below the wall surface.

In the transfer line connection of FIG. 5C, the threaded retainer insert 36' is secured to housing wall 46 by the engagement of screw threads on its outer surface with the internal screw threads tapped into the wall. The threaded insert 36' is formed with a stepped central passage 108, communicating with the passage 104 in housing wall 46, to permit fluid flow between transfer line 28" and housing 18. A portion of the length of transfer line 28" is crimped to form an overlapping radial flange 112 near the axial end of the transfer line, and the length of the tube between the flange and transfer line end is inserted into the enlarge passage 110. The transfer line 28" is inserted into the passage 110, flange 112 contacts the adjacent face of the threaded insert 36', and the flange is secured to the adjacent face of insert 36' at 113 by welding, soldering or brazing. As shown in FIG. 1B, each insert 36' can be molded in place without having to be machined and screwed into the housing wall 46. The outer surface of the insert can either extend outward from the surface of the wall, or be located flush with the wall surface, or below the wall surface.

Figure 6A:
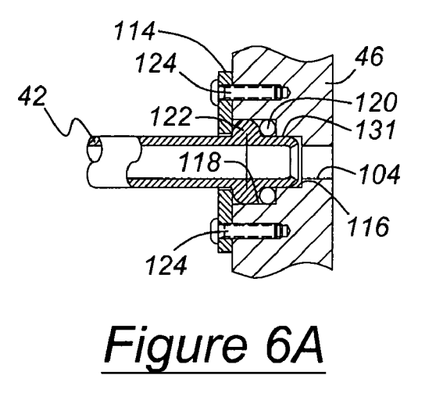
FIGS. 6A-6E are cross sections taken at plane 6 of FIG. 2.
Figure 6B:
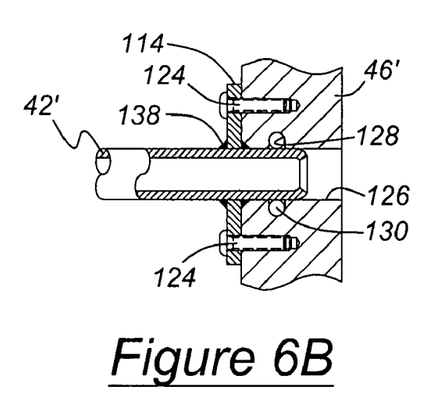
Figure 6C:
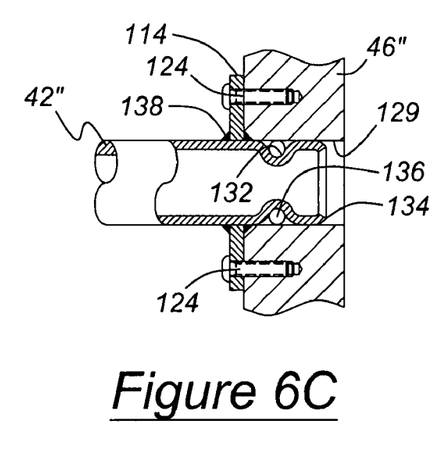

FIGS. 6A-6C show alternate connections for securing a transfer line 42, 44 to housing wall 46 using a retention plate 114.

In the connection of FIG. 6A, the housing wall 46 is formed with a stepped central opening extending through the thickness of the wall. An intermediate surface 116 of the opening is located between the hydraulic passage 104 and the largest diameter portion 118 formed in the thickness of the wall. A portion of the length of transfer line 42 is crimped to form an overlapping radial flange 122 near the axial end of the transfer line, and the length of the tube between the flange and transfer line end is inserted into the opening portions 116, 118. A sealing device 120, such as an O-ring, is fitted among a step in the housing wall 46, the flange 122, and the length 131 of the transfer line that extends between the flange and the line end. The retainer plate 114 is formed with an open central hole through its thickness so that the plate can be moved along the transfer line into engagement with the outer surface of the flange 122 and into contact with the housing outer surface. A threaded attachment or attachments 124 secure plate 114 to the housing wall 46. Producing a preloaded fit among O-ring 120, wall 46, and transfer line 42 by compressing the O-ring seals the connection. The flare or flange 122 also prevents extrusion of the seal device 120.

When the transfer lines 42, 44 are straight, as shown in FIG. 2, plate 114 can be deleted, and each the lines is secured to the wall 46 using the flange 122 fitted into the opening 118.

In the transfer line connection of FIG. 6B, the wall housing 46' is formed with a single opening 126, which extends through the housing wall and is formed with an internal recess 128, fitted with a sealing device such as an O-ring 130. Retainer plate 114 is secured to the transfer line 42' by welding, brazing or soldering forming a fillet 138 at an axial location that is spaced from an end of the tube. Fasteners 124 secure retainer plate 114 to the housing wall 46. This provides a length of transfer line 42' that is inserted into opening 126, overlapping the radial inner surface of the sealing device 130 and compressing the sealing device to provide a hydraulic seal between opening 126 and transfer line 42'.

Figure 6D:
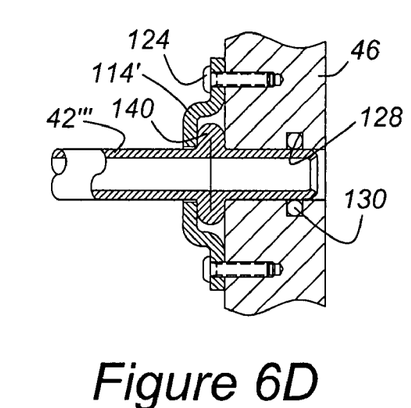

Alternatively, as shown in FIG. 6D, a plate 114', secured by attachments 124 to the wall 46, may be joggled over a flange 140 formed on each transfer line 42'''. Recess 128 contains an O-ring 130, or another sealing device.

Figure 6E:
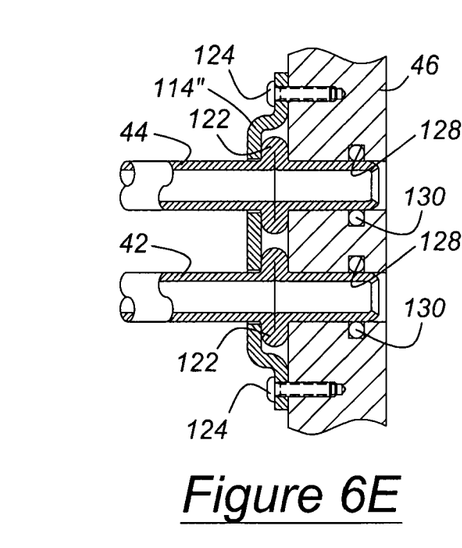

In FIG. 6E each transfer line 42, 44 is formed with a flared flange 122, and secured to the wall 46 by a single retainer plate 114". The wall 46 is formed with recesses 128, each recess containing an O-ring 130, or another sealing device. The plate retainers 114, 114', 114" allow the transfer lines to rotate, thereby facilitating their installation and assembly.

Referring to FIG. 6C, housing wall 46 is formed with a single opening 129 extending entirely through the thickness of the wall. The transfer line 42" is formed with a recess 132, which is spaced axially from the end 134 of the transfer line. The recess 132 is sized to receive a sealing device 136, such as an O-ring. Retainer plate 114 is secured to the transfer line 42" by welding, brazing or soldering forming a fillet 138 at an axial location that is spaced from an end of the tube. Retainer plate 114 is secured by fasteners 124 to the outer surface of the housing wall 46 such that the adjacent faces of the retainer plate (114) and housing wall 46 are in mutual contact. The transfer line 42" is moved into engagement with housing wall 46 such that the sealing device 136 engages opening 129 with an interference fit that compresses the seal 136, thereby providing a fluid type connection between the opening 129 and the transfer line 42".

When the transfer lines 42", 44" are straight, as shown in FIG. 2, plate 114 can be deleted, and each the lines is then secured to the wall 46" using an interference fit between the outer surface of the line and the opening 129.

Figure 7A:
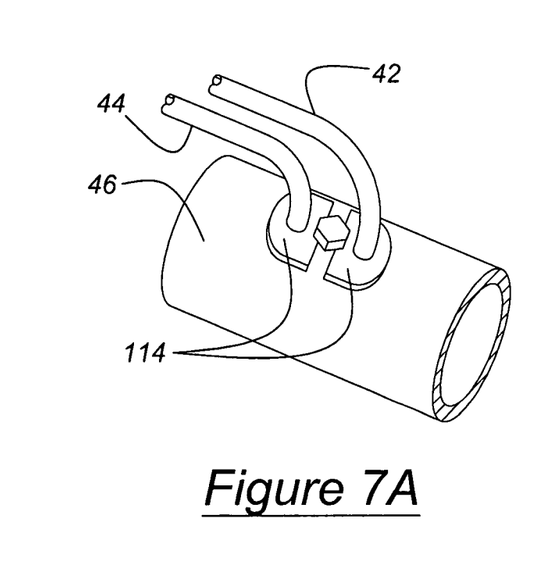
FIG. 7A is an external view of a housing showing transfer lines secured by retainer plates.
Figure 7B:
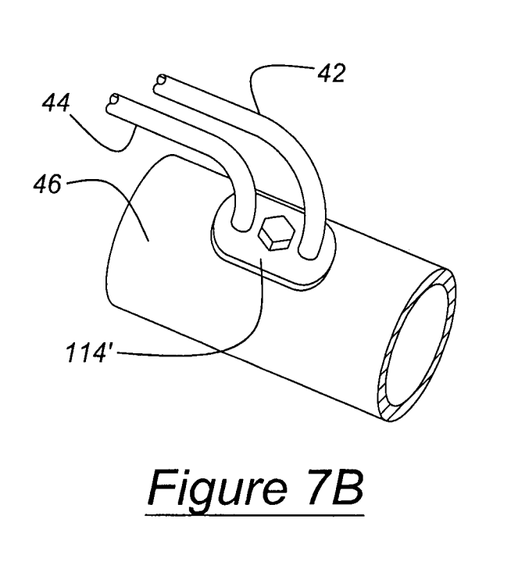
FIG. 7B is a view showing the transfer lines of FIG. 7 secured by a single retainer plate.

FIG. 7A is an external view of a housing 10 showing transfer lines 42, 44 secured by retainer plates 144 using a single hex headed attachment integrated into a single retainer plate 114', as shown FIG. 7B.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. Apparatus for carrying hydraulic fluid in an automotive steering system, comprising:
   a tube including a tube wall formed with a first port extending though a thickness of the tube wall;
   a housing including a housing wall formed with a second port extending though a thickness of the housing wall;
   a fluid transfer line for carrying hydraulic fluid between the tube and the housing, the fluid transfer line having a first end and a second end;
   a retainer secured to the housing, the retainer including a lateral opening formed therethrough communicating with the second port of the housing;
   a fitting secured to an outer surface of the tube, the fitting including a radial passage communicating with the first port of the tube and a lateral passage communicating with the radial passage;
   wherein the fluid transfer line extends only parallel to the outer surface of the tube such that a portion of the first end of the fluid transfer line extends through the lateral opening of the retainer and into a portion of the second port of the housing and is disposed therein in an interference fit therewith and a portion of the second end of the fluid transfer line extends into a portion of the lateral passage of the fitting and is disposed therein in an interference fit therewith.

2. The apparatus according to claim 1 wherein
   the fitting is secured to the outer surface of the tube by at least one of welding, brazing and soldering.

3. The apparatus according to claim 1 wherein
   the second end of the fluid transfer line disposed in the lateral passage is secured thereto by at least one of welding, brazing and soldering.

* * * * *